US012809226B2

(12) United States Patent
Heffernan et al.

(10) Patent No.: US 12,809,226 B2
(45) Date of Patent: Nov. 24, 2026

(54) TRANSFER OF SIGNALS BETWEEN THE RADIO FREQUENCY AND TERAHERTZ FREQUENCY DOMAINS

(71) Applicant: IMRA America, Inc., Ann Arbor, MI (US)

(72) Inventors: Brendan Heffernan, Boulder, CO (US); Antoine Jean Gilbert Rolland, Longmont, CO (US); James Greenberg, Boulder, CO (US)

(73) Assignee: IMRA America, Inc., Ann Arbor, MI (US)

( * ) Notice: Subject to any disclaimer, the term of this patent is extended or adjusted under 35 U.S.C. 154(b) by 318 days.

(21) Appl. No.: 18/648,974

(22) Filed: Apr. 29, 2024

(65) Prior Publication Data

US 2024/0369905 A1 Nov. 7, 2024

Related U.S. Application Data

(60) Provisional application No. 63/499,407, filed on May 1, 2023.

(51) Int. Cl.
*G02F 1/35* (2006.01)

(52) U.S. Cl.
CPC ............ *G02F 1/353* (2013.01); *G02F 1/3501* (2013.01); *G02F 2203/56* (2013.01)

(58) Field of Classification Search
CPC ............................................ G02F 1/353–3548
See application file for complete search history.

(56) References Cited

U.S. PATENT DOCUMENTS

| | | | | |
|---|---|---|---|---|
| 10,050,704 | B1 * | 8/2018 | Yap | H01S 5/0687 |
| 10,095,083 | B2 * | 10/2018 | Kaertner | G02F 1/3544 |
| 10,454,238 | B2 * | 10/2019 | Fermann | H01S 3/1307 |
| 11,409,185 | B2 | 8/2022 | Kuse et al. | |
| 12,547,048 | B1 * | 2/2026 | Rabiei | G02F 1/212 |
| 2022/0221583 | A1 | 7/2022 | Rolland et al. | |
| 2024/0369905 | A1 * | 11/2024 | Heffernan | G02F 1/3501 |
| 2026/0063841 | A1 * | 3/2026 | Soltani | G02B 6/12007 |
| 2026/0269558 | A1 * | 9/2026 | Yeo | H01S 3/1305 |

OTHER PUBLICATIONS

Bustos-Ramirez, Ricardo, et al. "Synchronization of Electro-Optically Modulated Kerr Soliton to a Chip-Scale Mode-Locked Laser PIC via Regenerative Harmonic Injection Locking." Journal of Lightwave Technology 40.6 (2022): 1742-1748.

(Continued)

*Primary Examiner* — Rhonda S Peace

(74) *Attorney, Agent, or Firm* — Knobbe, Martens, Olson & Bear, LLP

(57) ABSTRACT

An apparatus is provided for spectral purity transfer between a radio frequency (RF) frequency spectral domain and a terahertz (THz) frequency spectral domain. The apparatus includes a first optical frequency comb (OFC) having a first operational frequency and a second OFC having a second operational frequency different from the first operational frequency. The apparatus further includes a THz oscillator, wherein the first OFC and the second OFC are locked with one another and the second OFC and the THz oscillator are locked with one another.

24 Claims, 6 Drawing Sheets

(56) References Cited

OTHER PUBLICATIONS

Consolino, L., et al. “Phase-locking to a free-space terahertz comb for metrological-grade terahertz lasers.” Nature Communications 3.1 (2012): 1040.
Freeman, Joshua R., et al. “Injection locking of a terahertz quantum cascade laser to a telecommunications wavelength frequency comb.” Optica 4.9 (2017): 1059-1064.
Khosropanah, P., et al. “Phase locking of a 2.7 THz quantum cascade laser to a microwave reference.” Optics letters 34.19 (2009): 2958-2960.
Maestrini, Alain, et al. “A 1.7-1.9 THz local oscillator source.” IEEE Microwave and Wireless Components Letters 14.6 (2004): 253-255.
Shin, Dong-Chel, et al. “Photonic comb-rooted synthesis of ultra-stable terahertz frequencies.” Nature Communications 14.1 (2023): 790.
Tetsumoto, Tomohiro, et al. “300 GHz wave with attosecond-level timing noise.” arXiv preprint arXiv:2009.10784 (2020).

* cited by examiner

TRANSFER OF SIGNALS BETWEEN THE RADIO FREQUENCY AND TERAHERTZ FREQUENCY DOMAINS

CLAIM OF PRIORITY

This application claims the benefit of priority to U.S. Provisional Appl. No. 63/499,407 filed May 1, 2023 and incorporated in its entirety by reference herein.

BACKGROUND

Field

The present application relates to spectral purity and stability transfer between the radio frequency (RF) and terahertz (THz) frequency domains of the electromagnetic spectrum.

Description of the Related Art

Spectral purity transfer refers to the process of maintaining or preserving the quality and integrity of an electromagnetic wave (e.g., signal) as it is transferred from one frequency domain to another. Various applications (e.g., high-speed communication systems, sensing, and imaging in the THz frequency range) rely on maintaining spectral purity for accurate and reliable operation.

In the case of transfer between the radio frequency (RF) and terahertz (THz) frequency domains, spectral purity transfer is particularly challenging due to the significant difference in the frequency ranges of the two domains. RF or microwave signals have frequencies typically in the range of 10 MHz to 1 GHz, while THz signals have frequencies in the range of 0.3 THz to 10 THz. This large frequency difference introduces various technical challenges, such as increased signal loss, dispersion, and interference. Previous efforts utilized sophisticated techniques (e.g., advanced filtering, amplification, and dispersion compensation methods) to mitigate these challenges to achieve spectral purity transfer from the RF frequency domain to the THz frequency domain while preserving the quality and integrity of the original signal throughout the transfer process.

SUMMARY

In certain implementations, an apparatus is provided for spectral purity transfer between a radio frequency (RF) frequency spectral domain and a terahertz (THz) frequency spectral domain. The apparatus comprises a first optical frequency comb (OFC) having a first operational frequency and a second OFC having a second operational frequency different from the first operational frequency. The apparatus further comprises a THz oscillator, wherein the first OFC and the second OFC are locked with one another and the second OFC and the THz oscillator are locked with one another.

In certain implementations, a method for transferring signals between a radio frequency (RF) frequency spectral domain and a terahertz (THz) frequency spectral domain is provided. The method comprises providing a first optical frequency comb (OFC) having a first operational frequency and a second OFC having a second operational frequency different from the first operational frequency. The method further comprises synchronizing the first OFC and the second OFC with one another. The method further comprises providing a THz oscillator. The method further comprises synchronizing the second OFC and the THz oscillator with one another.

DETAILED DESCRIPTION

Figure 1:
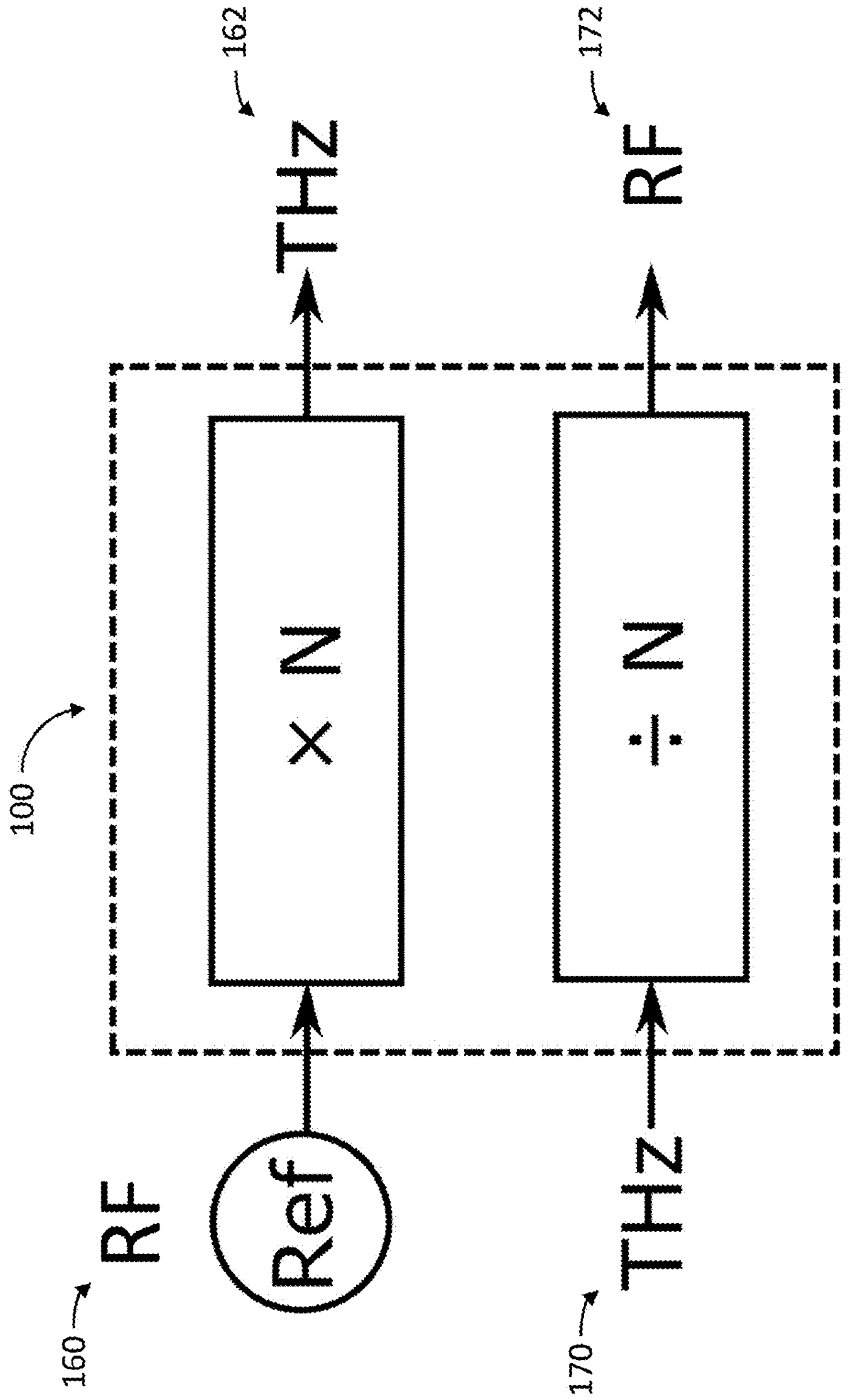
FIGS. 1, 2, and 3A-3B schematically illustrate example apparatus in accordance with certain implementations described herein.

The THz domain (e.g., regime) has historically been an underutilized portion of the electromagnetic spectrum, in part due to the "terahertz gap," a term used to describe the lack of mature or feasible technologies for THz generation and detection. However, the past few decades have seen steady progress and the THz domain is now prime for commercialization. In particular, the advent of fast photomixers capable of generating THz radiation via the difference frequency of two optical tones allows bridging of the terahertz gap.

Various precision applications utilize metrological standards in the THz domain. Examples of such applications include, but are not limited to: spectroscopy, communications, and THz radar. Additionally, processing signals in the THz domain with readily available electronics utilizes faithfully dividing the signals down to the RF domain (e.g., reading out the frequency difference between two lasers interrogating a molecule in the THz domain for a THz spectrometer).

Certain implementations described herein provide a method of transferring information (e.g., with spectral purity, frequency stability, and/or high fidelity) from one domain to another utilizing photonic technologies. For example, optical frequency combs (OFCs) can be used as "frequency gears" linking one electromagnetic domain to another. OFCs have previously been successfully applied to optical clocks, converting the stability of an electronic transition in an atom in the optical domain down to the microwave domain.

In certain implementations, photonics sources (e.g., lasers, OFCs, etc.) are used as THz sources through difference frequency generation. In particular, two optical lines separated by THz frequencies incident on fast photo-sensitive elements can be used to generate THz radiation. Photonic sources of THz signals can leverage the mature tools and techniques for frequency stabilization in the optical domain and transfer the frequency stabilization to the THz domain. Another benefit of photonic technologies for THz generation is that the difference between optical frequencies can be changed to cover the entirety of the microwave, millimeter wave (mmW), and THz domains.

Certain implementations described herein provide two-way transfer of signals between the radio frequency (RF) and terahertz (THz) frequency domains (e.g., regimes; regions) by interleaving two synchronized optical frequency combs with microwave and millimeter-wave repetition rate frequency, respectively, and a dual-wavelength laser with a frequency separation in the THz regime. For example, the transfer can be from the RF domain to the THz domain or can be from the THz domain to the RF domain. Certain implementations described herein can be used in applications including but not limited to: high-resolution spectroscopy; gas sensing; short-range, high data rate wireless communications (e.g., 6G); non-destructive testing and imaging at various frequencies; automotive sensors for self-driving vehicles. For example, to improve the reliability of wireless communication systems that utilize THz waves as a carrier emitter or a local oscillator for reception, certain implementations described herein can be used to transfer the stability of a microwave atomic clock to the THz frequency domain. For another example, for rotational spectroscopy on molecules, certain implementations described herein can be used to divide the frequency of a THz local oscillator to the RF frequency domain to track the stability of the molecule's rotation to the International System of Units (SI) second.

FIGS. 1, 2, and 3A-3B schematically illustrate an example apparatus 100 in accordance with certain implementations described herein. In certain implementations, the apparatus 100 can be used to transfer spectrally encoded information from the RF domain to the THz domain and/or from the THz domain to the RF domain. For example, input RF signals can be transferred (e.g., multiplied up) to the THz domain (e.g., by generating THz signals), while substantially maintaining frequency stability and/or spectral purity. For another example, input THz signals can be transferred (e.g., divided down) to the RF domain (e.g., by generating RF signals).

Figure 2:
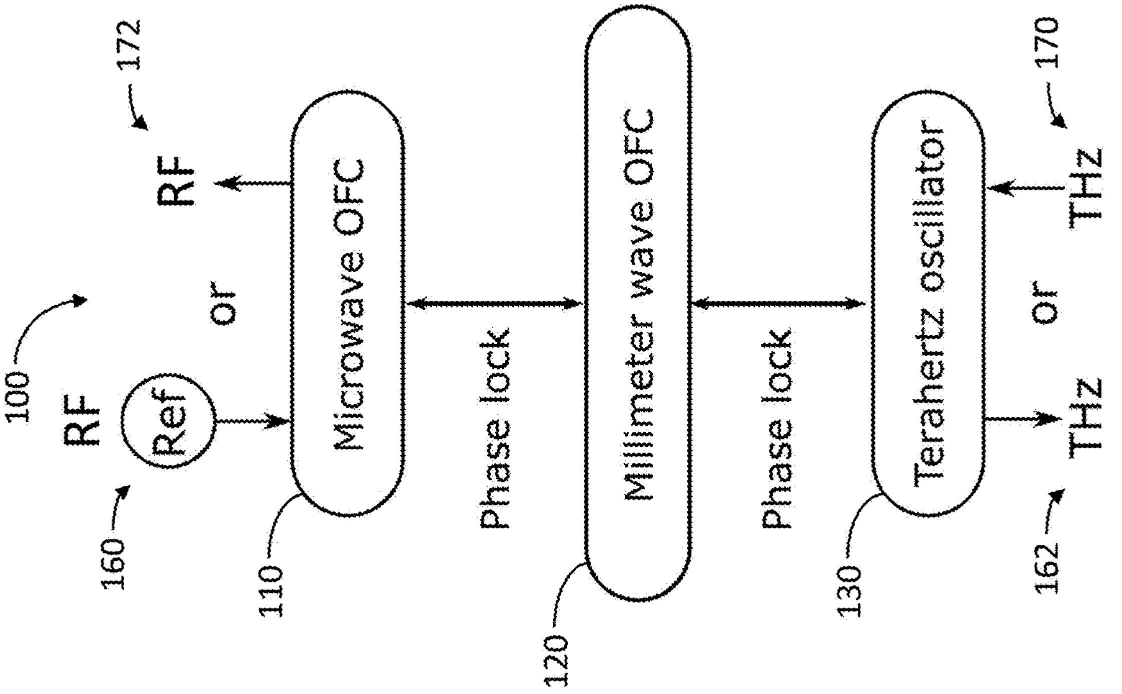
Figure 3B:
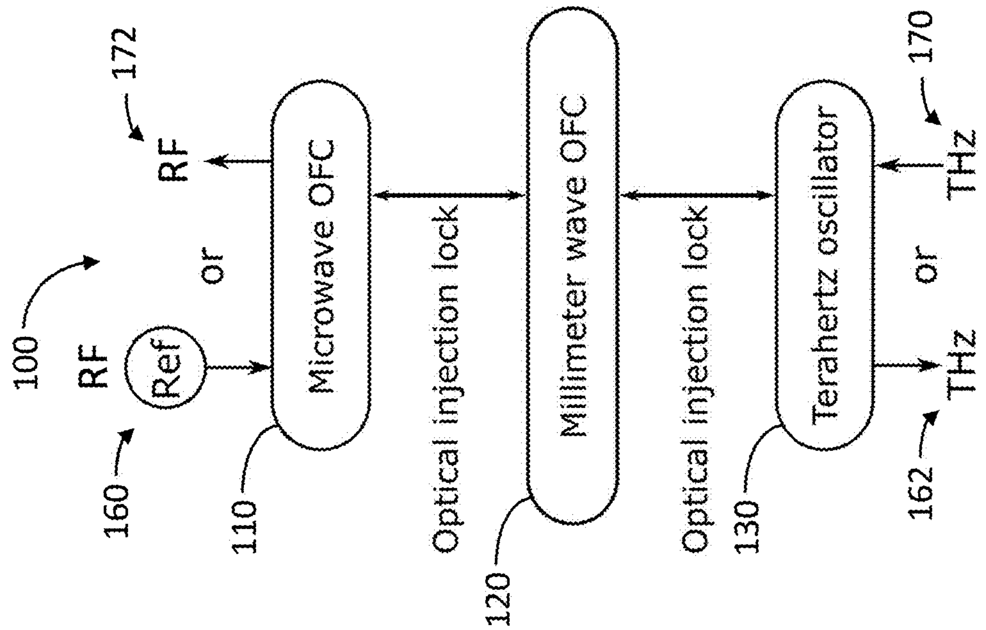
Figure 3A:
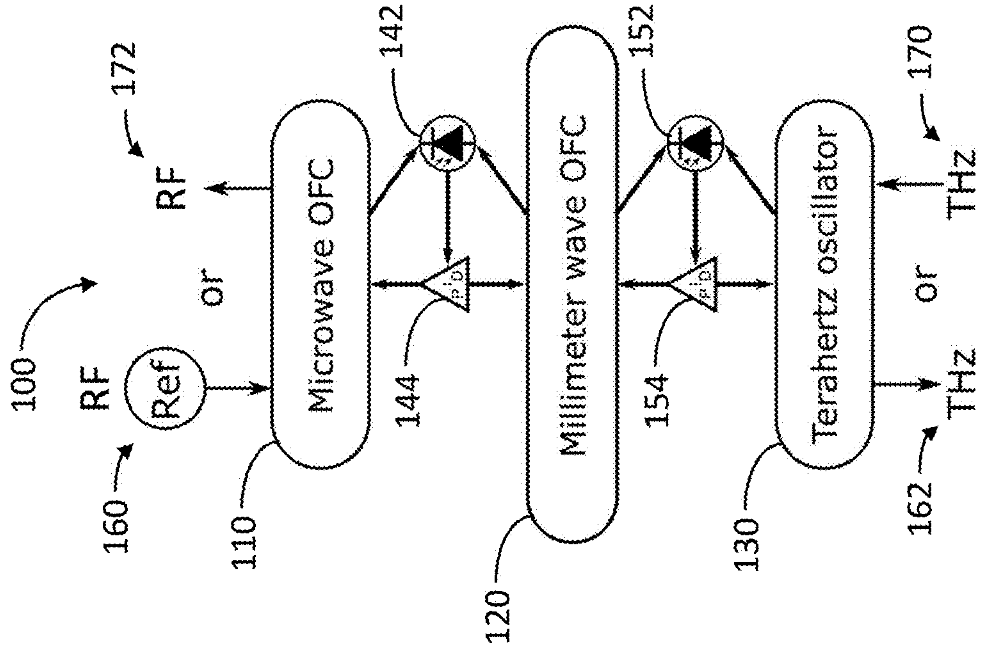

As shown in FIGS. 2 and 3A-3B, the apparatus 100 comprises a first optical frequency comb (OFC) 110 having a first operational frequency (e.g., corresponding to a first repetition rate) and a second OFC 120 having a second operational frequency (e.g., corresponding to a second repetition rate) different from the first operational frequency. The apparatus 100 further comprises a THz oscillator 130. The first OFC 110 and the second OFC 120 are locked (e.g., phase locked) with one another and the second OFC 120 and the THz oscillator 130 are locked (e.g., phase locked) with one another.

In certain implementations, the first OFC 110 comprises a microwave OFC and the first operational frequency is in a range of 5 GHz to 50 GHz (e.g., 5 GHz to 40 GHZ). Examples of the first OFC 110 compatible with certain implementations described herein include, but are not limited to: electro-optic combs; fiber frequency combs; dissipative Kerr soliton (DKS) combs (e.g., regardless of specific material); semiconductor mode locked laser diodes (MLLDs); solid state mode locked lasers (e.g., Ti: sapphire lasers; regardless of mode-locking technique); atomic clocks (e.g., microwave atomic clock, an example of which is a Rb clock).

In certain implementations, the second OFC 120 comprises a millimeter wave (mmW) OFC and the second operational frequency is in a range of 80 GHz to 600 GHZ (e.g., 80 GHz to 500 GHZ). Examples of the second OFC 120 compatible with certain implementations described herein include, but are not limited to: dissipative Kerr soliton (DKS) combs (e.g., comprising microresonators such as micro-ring resonators).

In certain implementations, the THz oscillator 130 is configured to generate electromagnetic radiation having a frequency in a range of 0.6 THz to 10 THz (e.g., 0.7 THz to 10 THz; 0.8 THz to 10 THz). The THz oscillator 130 can be based on optical photomixing. Examples of the THz oscillator 130 compatible with certain implementations described herein include, but are not limited to: two diode lasers; dual-wavelength laser with terahertz frequency separation (e.g., in a range of 0.6 THz to 10 THz); dual frequency Brillouin lasers; dissipative Kerr soliton (DKS) combs. The THz oscillator 130 can comprise at least one photosensitive element (e.g., photodetector) configured to convert dual-wavelength laser radiation into THz radiation. An example self-injection locked, dual wavelength Brillouin laser source compatible for use as the THz oscillator 130 in accordance with certain implementations described herein is disclosed by U.S. patent application Ser. No. 18/193,954, entitled "Optical Millimeter-Wave Oscillator Disciplined by Rotational Spectroscopy," and incorporated in its entirety by reference herein.

In certain implementations in which the power radiated from photomixing on current-generation photosensitive elements is very weak (e.g., below 1 microwatt) in the frequency range of 1 THz to 3 THz, the apparatus 100 further comprises a quantum cascade laser (QCL) configured to receive (e.g., be injection locked by) the THz signal 162 from the THz oscillator 130 and to amplify the THz signal 162 without degrading the phase noise characteristics of the THz signal 162.

Various techniques of locking (e.g., frequency locking; phase locking) the first OFC 110 with the second OFC 120 and/or of locking (e.g., frequency locking; phase locking) the second OFC 120 with the THz oscillator 130 are compatible with certain implementations described herein. For example, the first OFC 110 and the second OFC 120 can have both of their degrees of freedom (e.g., carrier envelop offset frequency; repetition rate frequency) synchronized with one another or with a residual stability lower than the absolute microwave atomic clock reference stability and/or the second OFC 120 and the THz oscillator 130 can be synchronized with one another (e.g., the THz oscillator 130 can be synchronized with n times the repetition rate frequency of the second OFC 120, such as by removing the carrier envelop offset frequency of the second OFC 120 from the error signal by subtracting the two photodetected beatnotes containing the fluctuations of the carrier envelop offset frequency). An example locking configuration compatible with certain implementations described herein is disclosed by U.S. Pat. No. 11,409,185, entitled "Compact Microresonator Frequency Comb," and incorporated in its entirety by reference herein.

As shown in FIG. 3A, synchronization of the first OFC 110 and the second OFC 120 can be achieved by actively phase locking the first OFC 110 and the second OFC 120 with one another by optical photodetection (e.g., optical heterodyne detection) of frequency differences between optical tones from the first OFC 110 and the second OFC 120 using at least one first photosensitive element 142 (e.g., photodiode; multiple photodiodes with an optical mixer) and providing a first input signal from the at least one first photosensitive element 142 to a first proportional integral derivative (PID) feedback loop 144 in operative communication with the first OFC 110 and/or the second OFC 120. The feedback from the first PID feedback loop 144 can be applied to the first OFC 110 when transferring from the RF domain to the THz domain or the feedback from the first PID feedback loop 144 can be applied to the second OFC 120 when transferring from the THz domain to the RF domain.

Also, as shown in FIG. 3A, synchronization of the second OFC 120 and the THz oscillator 130 can be achieved by actively phase locking the second OFC 120 and the THz oscillator 130 with one another by optical photodetection (e.g., optical heterodyne detection) of frequency differences between optical tones from the second OFC 120 and the THz oscillator 130 using at least one second photosensitive element 152 (e.g., photodiode; multiple photodiodes with an optical mixer) and providing a second input signal from the at least one second photosensitive element 152 to a second PID feedback loop 154 in operative communication with the second OFC 120 and/or the THz oscillator 130. The feedback from the second PID feedback loop 154 can be applied to the second OFC 120 when transferring from the RF domain to the THz domain or the feedback from the second PID feedback loop 154 can be applied to the THz oscillator 130 when transferring from the THz domain to the RF domain.

For another example, as shown in FIG. 3B, synchronization of the first OFC 110 and the second OFC 120 can be achieved by passively phase locking the first OFC 110 and the second OFC 120 with one another by optical injection locking (e.g., offset optical injection locking) and/or synchronization of the second OFC 120 and the THz oscillator 130 can be achieve by passively phase locking the second OFC 120 and the THz oscillator 130 with one another by optical injection locking (e.g., offset optical injection locking).

Any combination of the examples of the first OFC 110, the second OFC 120, and the THz oscillator 130 disclosed above are compatible with certain implementations described herein. In addition, any combination of the example locking schemes disclosed above for locking the first OFC 110 with the second OFC 120 and/or locking the second OFC 120 with the THz oscillator 130 are compatible with certain implementations described herein. The noise characteristics of the resultant signals (e.g., THz signals 162; RF signals 172) are dependent on the particular first and second OFCs 110, 120 and THz oscillator 130 and the particular locking scheme used. Certain implementations described herein provide physically compact, simple, tunable, and/or high-resolution information transfer between the RF domain and the THz domain. For example, use of three chip-scale microresonators that produce three DKS combs for the first OFC 110, the second OFC 120, and the THz oscillator 130 can have a footprint of less than 25 $mm^2$, excluding control electronics and lasers. For another example, use of tunable diode lasers or a Brillouin source as the THz oscillator 130 can result in an output THz signal 162 that is continuously tunable over a wide frequency range (e.g., a range of 0.6 THz to 10 THz).

In certain implementations, translation from the RF domain to the THz domain or from the THz domain to the RF domain is configured by how the first OFC 110, the second OFC 120, and THz oscillator 130 are locked with one another. For example, for translation from the RF domain to the THz domain, the second OFC 120 is phase locked to the first OFC 110 and the THz oscillator 130 is phase locked to the second OFC 120. An RF signal 160 can be used to reference (e.g., drive) the first OFC 110 and a THz signal 162 can be outputted from the THz oscillator 130, the THz signal 162 having a frequency stability and/or purity transferred from the RF domain to the THz domain. For example, the first OFC 110 can receive an RF signal 160 (e.g., 10 MHZ) distributing an Coordinated Universal Time (UTC) value and the stability of the defined second from the UTC value can be transferred to the THz signal 162.

For another example, for translation from the THz domain to the RF domain, the second OFC 120 is phase locked to the THz oscillator 130 and the first OFC 110 is phase locked to the second OFC 120. A THz signal 170 can be used to reference the THz oscillator 130 and an RF signal 172 can be outputted from the first OFC 110, the RF signal 172 (e.g., with a frequency divided down to the RF domain) having a frequency stability and/or purity transferred from the THz domain to the RF domain. For example, the THz oscillator 130 can receive a THz signal 170 corresponding to a rotational transition of a molecule through spectroscopy, and the THz signal 170 can be down-converted to the RF signal 172 in the RF (e.g., microwave) domain.

Figure 4A:
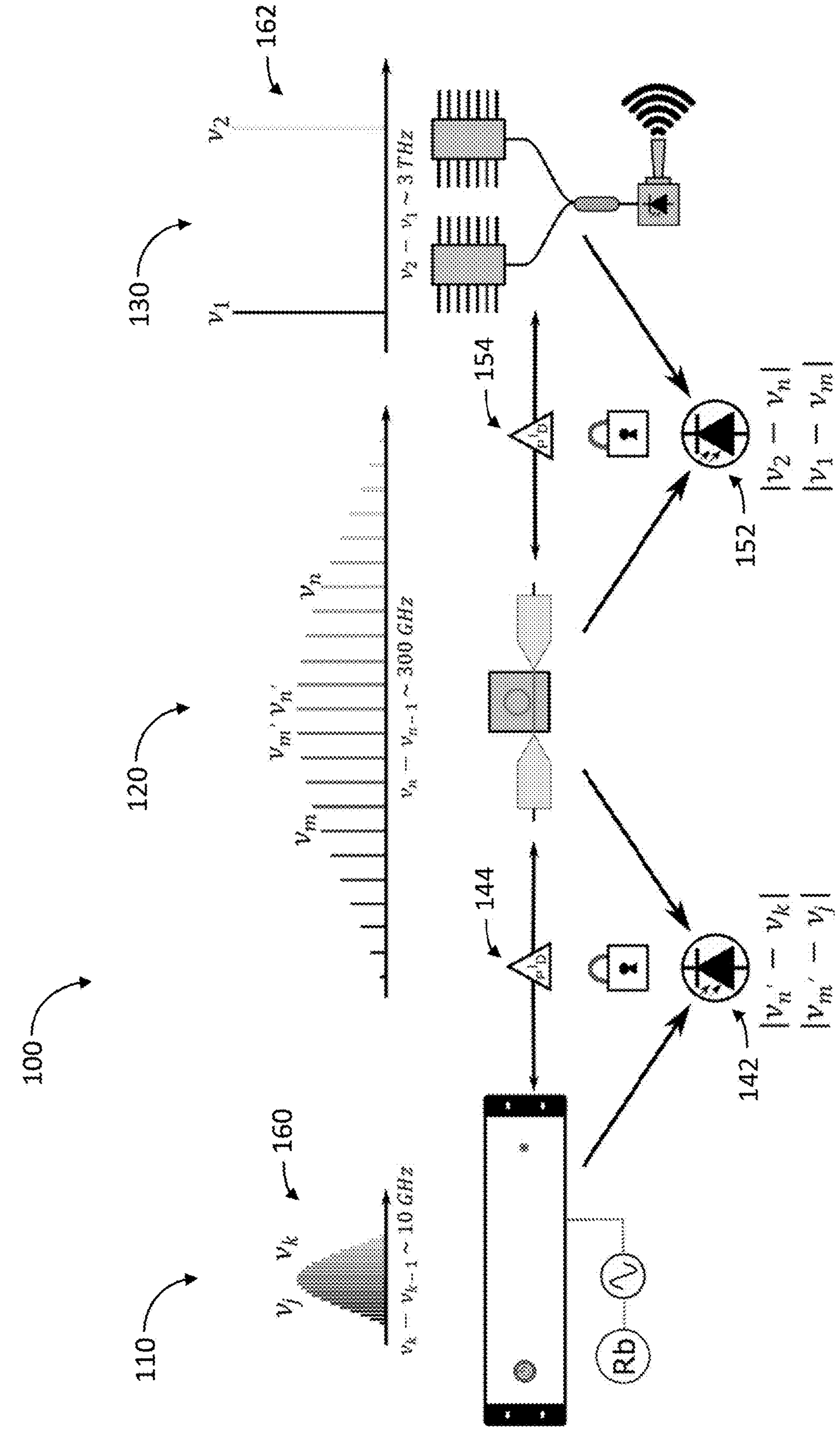
FIG. 4A schematically illustrates an example apparatus in accordance with certain implementations described herein.

FIG. 4A schematically illustrates an example apparatus 100 in accordance with certain implementations described herein. The first OFC 110 comprises an atomic clock (e.g., Rb clock) with a first operational frequency (e.g., frequency difference between adjacent comb lines) of about 10 GHz, the second OFC 120 comprises a microresonator with a second operational frequency (e.g., frequency difference between adjacent comb lines) of about 300 GHz, and the THz oscillator 130 comprises a pair of diode lasers configured to generate a pair of lines having a frequency difference of about 3 THz.

Figure 4B:
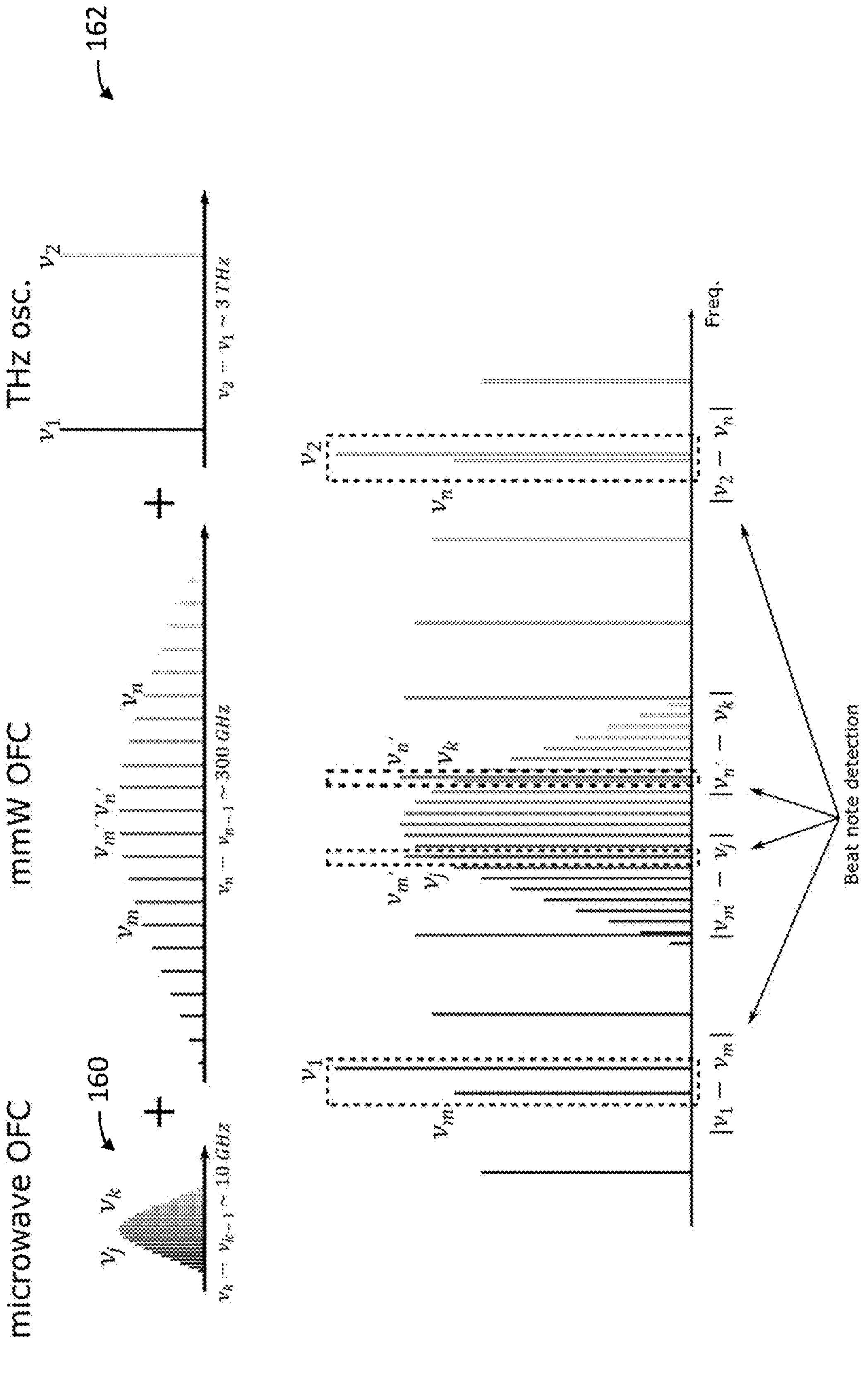
FIG. 4B schematically illustrates the actively locked optical spectra of the first OFC, the second OFC, and the THz oscillator and their use in accordance with certain implementations described herein.

FIG. 4B schematically illustrates the actively locked optical spectra (e.g., using photodetection with PID feedback locking) of the first OFC 110, the second OFC 120, and the THz oscillator 130 and their use in accordance with certain implementations described herein. As shown in FIGS. 4A and 4B, the photodetection of two pairs of optical lines (e.g., detection of two beat notes: $|v_n-v_k|$, $|v_m-v_j|$) by the at least one first photosensitive element 142 can be used in the first PID feedback loop 144 to adjust either the first OFC 110 or the second OFC 120 and the photodetection of two pairs of optical lines (e.g., detection of two beat notes: $|v_1-v_m|$, $|v_2-v_n|$) by the at least one second photosensitive element 152 can be used in the second PID feedback loop 154 to adjust either the second OFC 120 or the THz oscillator 130. FIG. 4B shows that the first OFC 110, the second OFC 120, and the THz oscillator 130 interact with one another and identifies the beatnotes used to synchronize them.

Figure 5:
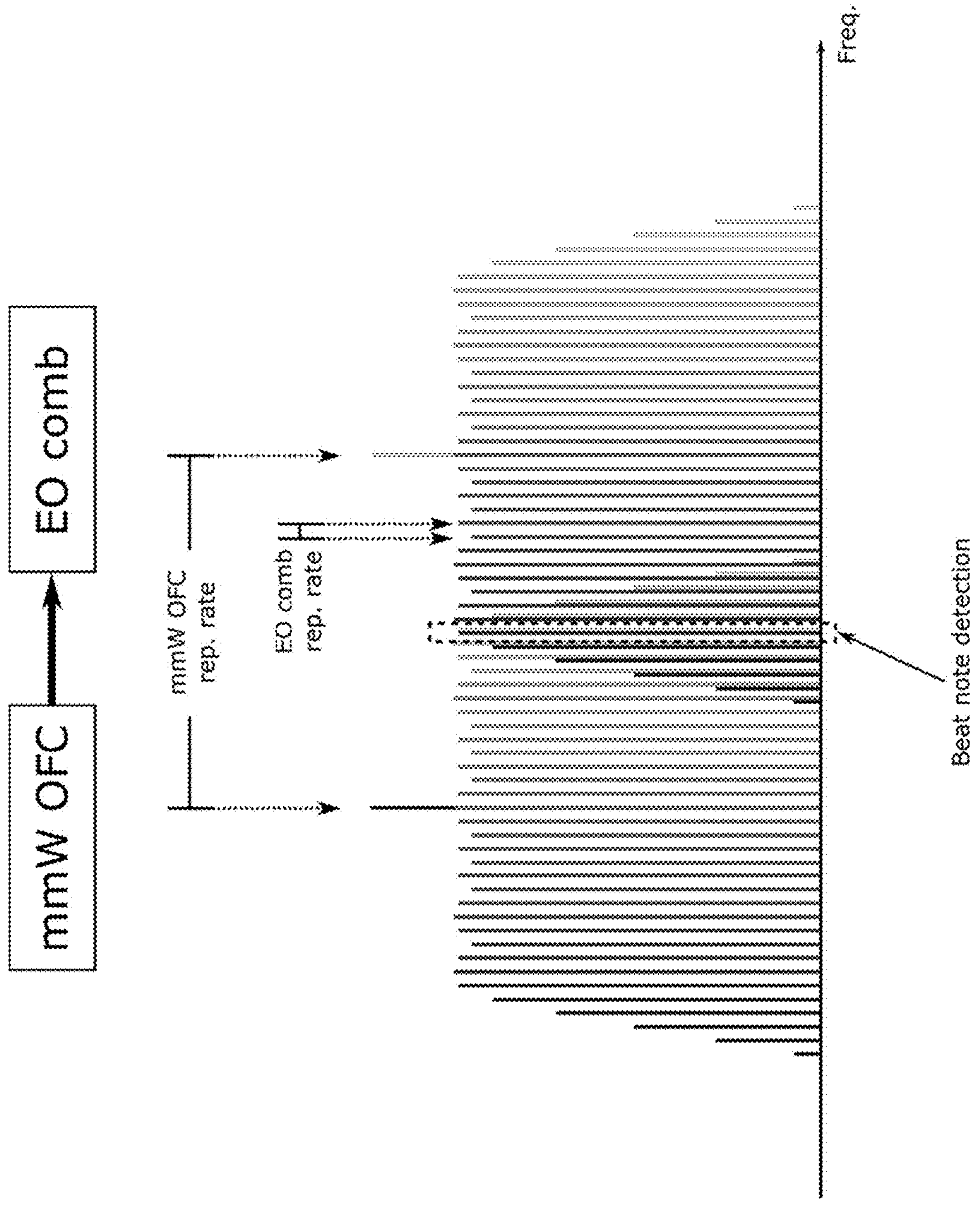
FIG. 5 schematically illustrates the optical spectra of an electro-optical comb using a mmW OFC as a primary comb line in accordance with certain implementations described herein.

FIG. 5 schematically illustrates the optical spectra of an electro-optical (EO) comb using a mmW OFC as a primary comb line in accordance with certain implementations described herein. The tones of the mmW OFC can be used as the seed lasers for the EO comb. FIG. 5 shows how the repetition rate frequency of the mmW OFC can be stabilized to the EO comb repetition rate frequency.

Example, non-limiting experimental data are included herein to illustrate results achievable by various implementations of the systems and methods described herein. All ranges of data and all values within such ranges of data that are shown in the figures or described in the specification are expressly included in this disclosure. The example experiments, experimental data, tables, graphs, plots, figures, and processing and/or operating parameters (e.g., values and/or ranges) described herein are intended to be illustrative of operating conditions of the disclosed systems and methods and are not intended to limit the scope of the operating conditions for various implementations of the methods and systems disclosed herein. Additionally, the experiments, experimental data, calculated data, tables, graphs, plots, figures, and other data disclosed herein demonstrate various regimes in which implementations of the disclosed systems and methods may operate effectively to produce one or more desired results. Such operating regimes and desired results are not limited solely to specific values of operating parameters, conditions, or results shown, for example, in a table, graph, plot, or figure, but also include suitable ranges including or spanning these specific values. Accordingly, the values disclosed herein include the range of values between any of the values listed or shown in the tables, graphs, plots, figures, etc. Additionally, the values disclosed herein include the range of values above or below any of the values listed or shown in the tables, graphs, plots, figures, etc. as might be demonstrated by other values listed or shown in the tables, graphs, plots, figures, etc. Also, although the data disclosed herein may establish one or more effective operating ranges and/or one or more desired results for certain implementations, it is to be understood that not every implementation need be operable in each such operating range or need produce each such desired result. Further, other implementations of the disclosed systems and methods may operate in other operating regimes and/or produce other results than shown and described with reference to the example experiments, experimental data, tables, graphs, plots, figures, and other data herein.

The invention has been described in several non-limiting implementations. It is to be understood that the implementations are not mutually exclusive, and elements described in connection with one implementation may be combined with, rearranged, or eliminated from, other implementations in suitable ways to accomplish desired design objectives. No single feature or group of features is necessary or required for each implementation. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein.

For purposes of summarizing the present invention, certain aspects, advantages and novel features of the present invention are described herein. It is to be understood, however, that not necessarily all such advantages may be achieved in accordance with any particular implementation. Thus, the present invention may be embodied or carried out in a manner that achieves one or more advantages without necessarily achieving other advantages as may be taught or suggested herein.

As used herein any reference to "one implementation" or "some implementations" or "an implementation" means that a particular element, feature, structure, or characteristic described in connection with the implementation is included in at least one implementation. The appearances of the phrase "in one implementation" in various places in the specification are not necessarily all referring to the same implementation. Conditional language used herein, such as, among others, "can," "could," "might," "may," "e.g.," and the like, unless specifically stated otherwise, or otherwise understood within the context as used, is generally intended to convey that certain implementation include, while other implementations do not include, certain features, elements and/or steps. In addition, the articles "a" or "an" or "the" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain implementations require at least one of X, at least one of Y, and at least one of Z to each be present.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within +10% of, within +5% of, within +2% of, within +1% of, or within +0.1% of the stated amount. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Thus, while only certain implementations have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the implementations described therein.

What is claimed is:

1. An apparatus for spectral purity transfer between a radio frequency (RF) frequency spectral domain and a terahertz (THz) frequency spectral domain, the apparatus comprising:

a first optical frequency comb (OFC) comprising a microwave OFC having a first operational frequency in a range of 5 GHz to 50 GHz;

a second OFC comprising a millimeter wave (mmW) OFC having a second operational frequency different from the first operational frequency and in a range of 80 GHz to 600 GHz; and a THz oscillator, wherein the first OFC and the second OFC are locked with one another and the second OFC and the THz oscillator are locked with one another.

2. The apparatus of claim 1, wherein the microwave OFC is selected from the group consisting of: electro-optic combs; fiber frequency combs; dissipative Kerr soliton (DKS) combs; semiconductor mode locked laser diodes (MLLDs); solid state mode locked lasers; atomic clocks.

3. The apparatus of claim 1, wherein the mmW OFC comprises a dissipative Kerr soliton (DKS) comb.

4. The apparatus of claim 1, wherein the THz oscillator is configured to generate electromagnetic radiation having a frequency in a range of 0.6 THz to 10 THz.

5. The apparatus of claim 4, wherein the THz oscillator is selected from the group consisting of: two diode lasers; dual-wavelength laser with multi-terahertz frequency separation; dual frequency Brillouin lasers; dissipative Kerr soliton (DKS) combs.

6. The apparatus of claim 4, wherein the THz oscillator further comprises at least one photosensitive element configured to convert dual-wavelength laser radiation into THz radiation.

7. The apparatus of claim 1, wherein the THz oscillator is configured to generate electromagnetic radiation having a frequency in a range of 0.8 THz to 10 THz.

8. An apparatus for spectral purity transfer between a radio frequency (RF) frequency spectral domain and a terahertz (THz) frequency spectral domain, the apparatus comprising:

- a first optical frequency comb (OFC) having a first operational frequency;
- a second OFC having a second operational frequency different from the first operational frequency;
- a THz oscillator, wherein the first OFC and the second OFC are locked with one another and the second OFC and the THz oscillator are locked with one another; and
- a quantum cascade laser (QCL) configured to receive a THz signal from the THz oscillator and to amplify the THz signal without degrading the phase noise characteristics of the THz signal.

9. The apparatus of claim 8, wherein the QCL is configured to be injection locked by the THz signal.

10. An apparatus for spectral purity transfer between a radio frequency (RF) frequency spectral domain and a terahertz (THz) frequency spectral domain, the apparatus comprising:

- a first optical frequency comb (OFC) having a first operational frequency;
- a second OFC having a second operational frequency different from the first operational frequency; and
- a THz oscillator, wherein the first OFC and the second OFC are locked with one another and the second OFC and the THz oscillator are locked with one another wherein the first OFC and the second OFC have both of their degrees of freedom synchronized with one another.

11. The apparatus of claim 10, wherein the degrees of freedom comprise a carrier-envelope-offset frequency and a repetition-rate frequency.

12. The apparatus of claim 10, wherein, for transfer from the RF frequency spectral domain to the THz frequency spectral domain, the second OFC is phase locked to the first OFC and the THz oscillator is phase locked to the second OFC.

13. The apparatus of claim 10, wherein for transfer from the THz frequency spectral domain to the RF frequency spectral domain, the second OFC is phase locked to the THz oscillator and the first OFC is phase locked to the second OFC.

14. A method for transferring signals between a radio frequency (RF) frequency spectral domain and a terahertz (THz) frequency spectral domain, the method comprising:

- providing a first optical frequency comb (OFC) comprising a microwave OFC having a first operational frequency in a range of 5 GHz to 50 GHz and a second OFC comprising a millimeter wave (mmW) OFC having a second operational frequency different from the first operational frequency and in a range of 80 GHz to 600 GHz;
- synchronizing the first OFC and the second OFC with one another;
- providing a THz oscillator; and
- synchronizing the second OFC and the THz oscillator with one another.

15. The method of claim 14, wherein said synchronizing the first OFC and the second OFC with one another comprises actively phase locking the first OFC and the second OFC with one another.

16. The method of claim 15, wherein said actively phase locking comprises photodetecting frequency differences between optical tones from the first OFC and the second OFC using at least one first photosensitive element and providing a first input signal from the at least one first photosensitive element to a first proportional integral derivative (PID) feedback loop in operative communication with the first OFC and/or the second OFC.

17. The method of claim 14, wherein said synchronizing the first OFC and the second OFC with one another comprises passively phase locking the first OFC and the second OFC with one another by optical injection locking.

18. The method of claim 17, wherein said optical injection locking comprises offset optical injection locking.

19. The method of claim 14, wherein said synchronizing the second OFC and the THz oscillator with one another comprises actively phase locking the second OFC and the THz oscillator with one another.

20. The method of claim 19, wherein said actively phase locking comprises photodetecting frequency differences between optical tones from the second OFC and the THz oscillator using at least one second photosensitive element and providing a second input signal from the at least one second photosensitive element to a second proportional integral derivative (PID) feedback loop in operative communication with the second OFC and/or the THz oscillator.

21. The method of claim 14, wherein said synchronizing the second OFC and the THz oscillator with one another comprises passively phase locking the second OFC and the THz oscillator with one another by optical injection locking.

22. The method of claim 21, wherein said optical injection locking comprises offset optical injection locking.

23. The method of claim 14, wherein said transferring signals from the RF frequency spectral domain to the THz frequency spectral domain maintains the spectral purity of the signals in the RF frequency spectral domain and/or said transferring signals from the THz frequency spectral domain to the RF frequency spectral domain maintains the spectral purity of the signals in THz frequency spectral domain.

24. The method of claim 14, wherein the THz oscillator is configured to generate electromagnetic radiation having a frequency in a range of 0.8 THz to 10 THz.

* * * * *